April 24, 1928.

J. F. P. COSTE 1,667,373

ELASTIC ELEMENT FOR RESILIENT WHEELS

Filed April 29, 1926    2 Sheets-Sheet 1

Inventor,
Jean François Pascal Costé
Stockbridge & Borst
Attys

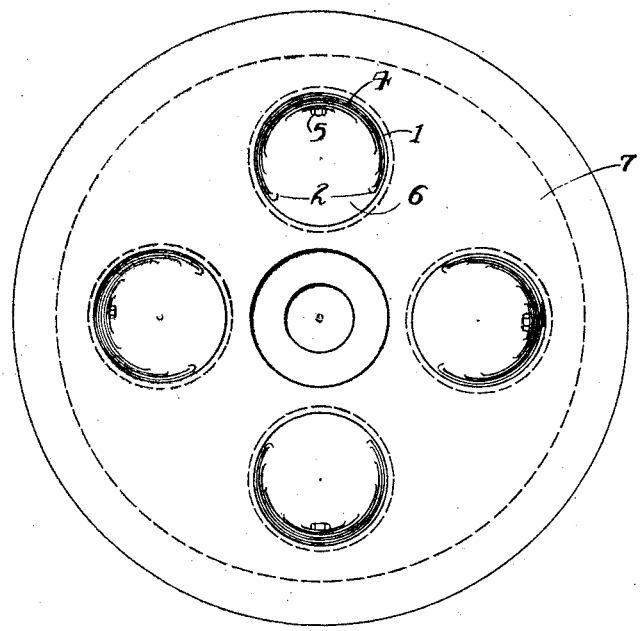
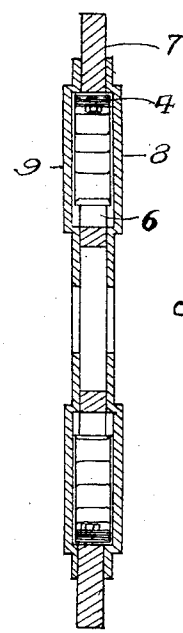
Fig. 4
Fig. 5

Patented Apr. 24, 1928.

1,667,373

UNITED STATES PATENT OFFICE.

JEAN FRANÇOIS PASCAL COSTE, OF BILLANCOURT, FRANCE.

ELASTIC ELEMENT FOR RESILIENT WHEELS.

Application filed April 29, 1926, Serial No. 105,374, and in France January 16, 1926.

The present invention relates to resilient wheels of the kind described in my application S. N. 585,179, filed the 30th of August, 1922, Patent No. 1,603,453 of October 19, 1926.

The invention provides improvements in the elastic elements employed for this class of wheels, and chiefly in the elastic elements employed in the apparatus set forth in the aforesaid application.

I have found that in practice the elastic elements entering into this construction of the wheel will not in all cases afford the desired results; for even though the results were satisfactory for elastic wheels used upon heavy motor or like vehicles, the results proved unsatisfactory for the wheels of touring vehicles and especially for the smaller vehicles.

Without laying stress upon the drawbacks inherent in the single concentric elastic element which was described in my former application, and was abandoned by reason of its weight which was too heavy for the touring vehicles, and chiefly on account of its excessive size for the wheels of heavy vehicles, I recognized, as concerns the construction of my elastic element with ends which are formed into spirals or volutes, and which are in contact, and which is adapted to be radially mounted, in plurality, around the hubs, that this type of elastic element offers certain drawbacks as concerns its use upon touring vehicles.

In fact, the wheels have but a limited elasticity, so the shock absorbing is abrupt and hard, by reason of the existence of weak points at the beginning of the spirals disposed at the ends of the annular elastic element, and this may occasion breakages if the elastic element is too closely pressed together; so that the elastic motion of the wheel cannot be considerable, and the maximum efficiency cannot be obtained. Also, it is not an easy matter to exactly limit the closing motion of this type of elastic element, and hence to regulate the amount of the elastic motion of the wheel, since this depends upon the number and the quality of the plate springs composing the elastic element; this number being however limited, as otherwise the ends of the springs, which must be left free, would become separated and misplaced.

As concerns another constructional form of my elastic element with curved ends which are out of contact and are connected together by compression springs, I observe that the aforesaid drawbacks are not so evident, since the amount of elasticity may be suitably regulated, although with some difficulty, by the use of springs having the proper compresssion, but that nevertheless since the number of springs in each element cannot be increased for the aforesaid reasons, the maximum efficiency of the wheel cannot be attained, and also that the compression springs and chiefly their points where they are attached to the ends of the elastic element represent a great difficulty in the construction of the device, and operate in a defective manner, since they must be replaced frequently and at a great expense.

But comparatively speaking, the last mentioned elastic element offered the best results as concerns the practical use upon touring vehicles, so that I sought to improve this element, and chiefly by a suitable combination of the force of the compression springs and the force and number of the spring plates, as far as possible.

After making a great number of experiments, in which the force of the compression springs was gradually reduced, I was enabled to obtain fairly good results, by entirely eliminating the compression springs placed between the open ends of the elastic elements and by increasing the force of the springs of the device, since I could not much increase the number of these springs, due to the above mentioned misplacing of the free ends.

But since the regulation of the elasticity of the wheel depends solely upon the character of the spring plates in use, this still constituted a great difficulty, and the maximum efficiency could not be attained, so that I concluded that the final and satisfactory solution consists in the use, for an improved circular elastic element with curved ends which are out of contact and are unprovided with compression springs, of a suitable number of spring plates which are placed together to form an elastic element, whose elasticity can be regulated with facility by reducing at will the number of plates in each element, and the plates can be mounted in the recesses in the wheel discs and can be inserted into the central disc of the wheel, with great facility.

According to this principle, and after various experiments, I was enabled to construct the apparatus, the subject-matter of the present invention, which consists of an improved elastic element for resilient wheels of the aforesaid class, which is characterized in that it consists of a set of spring plates of the same or different nature, in any suitable number and of the same or different width, but of progressively decreasing lengths, which are superposed in such manner that the middle lines dividing the respective plates into two parts of equal length are juxtaposed in a common perpendicular plane, the arrangement composed of the said plates being secured in the said middle plane by one or more rivets, bolts, lines or points of soldering or welding, the whole device being curved and shaped so as to form a split ring or cylinder. The shortest spring plate is situated in the interior and the longest plate at the exterior; the ends of the said external plate are curved or rolled towards the interior to prevent them from being covered or overlapping in the event of a contact due to the closing of the edges of the split cylinder under an abnormal stress. If desired, the ends of the other plates may be somewhat curved inwardly to facilitate the sliding of the plates on one another and to obviate all gripping.

The following description, with reference to the appended drawings which are given by way of example, sets forth an embodiment of the invention.

Fig. 1 is a side elevation of my improved elastic element in the unloaded position which it occupies when situated in the recesses in the lateral discs and extending through the aperture in the central disc forming the elastic wheel above referred to.

Fig. 4 is a view in side elevation of an assembled wheel of my invention, with one of the two lateral cheeks removed to show the elastic elements in assembled position, and Fig. 5 is a vertical sectional view of the embodiment of Fig. 4.

Figure 1:
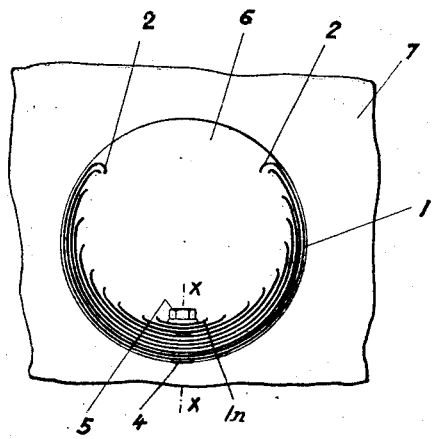
Figure 2:
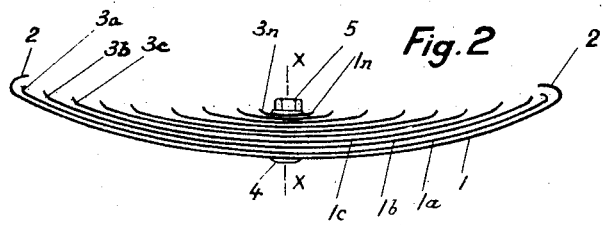
Fig. 2 is a side view showing the method of assembling the spring plates composing the elastic element, when the said plates are spread out.
Figure 3:
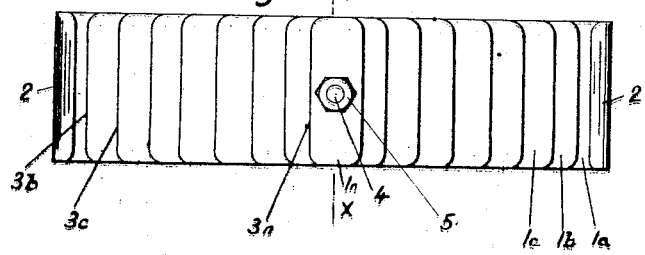
Fig. 3 is a corresponding plan view.

In the drawings, the improved elastic element consists of a main spring plate 1, having the greatest length of the series, which is suitably curved at its ends 2; to the said plate are secured an adequate number of spring plates $1^a$, $1^b$, $1^c$ ... $1^n$ of decreasing length; whose width and nature may be the same as, or different from, the main spring plate; the ends of the said springs are preferably somewhat curved inwardly at $3^a$, $3^b$, $3^c$ ... $3^n$, whereby they may more readily slide upon one another. The whole device composed of the said springs is placed symmetrically with reference to a perpendicular plane $x$—$x$ intersecting the device at the middle, and the arrangement is held together by a bolt or screw 4 and a nut 5.

The said elastic element is completed by bending it into the shape of a split cylinder or ring, with the main plate 1 disposed at the exterior and the shortest plate $1^n$ in the interior, the device being inserted into one of the apertures 6 in the central disc 7 of the wheel, of which a portion is shown in Fig. 1. The sides of the said split cylinder or ring extend outwardly on both sides of the said disc, and are disposed in suitable lateral cheeks in the same manner as the elastic devices which were formerly employed and for which the present device is substituted, and without making any change in the other parts of the wheel.

To facilitate the mounting of the said elastic elements in the wheels, the said elements may be preliminarily maintained in the form of a split ring by surrounding them with a ring or hoop whose internal diameter is somewhat smaller than the diameter of the apertures 6 in the discs 7 and the diameter of the recesses formed in the cheeks 8 and 9.

It is simply necessary to insert the said element by one end into the disc 7, without any effort of compression upon the element, and then to disengage the said ring or hoop by sliding it out.

Due to my said improved elastic element, the aperture or gap which is allowed between the curved ends 2 of the main outer plate 1, permits of limiting the closing movement of the spring and hence the amplitude of the elastic motion of the wheel whose maximum is determined by the abutment contact of the bent ends 2 of the main plate 1, and may thus be made to conform to the work performed by this class of wheel.

Furthermore, due to the progressive shortening of the spring plates and to the means by which they are secured together, no entangling nor disengagement are to be apprehended, and I am enabled to employ lengths of plates so calculated that a diameter, drawn in any position occupied by the element in its recesses, will not have with the spring plates a number of points of intersection exceeding the whole number of the spring plates, and this affords a pressure in the radial direction for the elastic element which is quite uniform upon the walls of the said recesses, irrespectively of the position of the element therein.

Obviously my improved elastic element is applicable to various types of resilient wheels, and especially wheels having a plurality of disks between which the elastic element cooperates. It is, of course, immaterial in which order the disks are positioned, so long as a disk is attached to the wheel rim, and another disk attached to the hub, each disk being provided with means cooperating with the elastic element, for the elastic maintenance of nominal concentric relationship.

It is further obvious that my said elastic element may as above stated be employed upon various types of elastic wheels such as landing wheels for aeroplanes, wheels for locomotives, tramways, elastic discs for machine coupling, clutch discs, pulleys and the like.

The said apparatus is susceptible of all accessory modifications in the details without departing from the spirit of the invention. For instance, in certain cases, to obviate all noise due to the impact between the two curved ends 2 of the main plate 1 which make contact upon the occurrence of a maximum or an abnormal effort, I may provide means for absorbing the shocks, for instance rubber bands, at the ends of the main spring plate, or the ends 2 of the main plate may be extended internally in the form of large and flexible spirals which are in constant contact with one another within the said cylinder or split ring after the manner disclosed by my previously mentioned patent, the said spirals, integral or separately secured, being so disposed as to interfere in no way with the work of the elastic element, no additional effort being exercised nor any resistance brought to bear upon the said element for this reason.

What I claim is:

1. An elastic element for a resilient wheel comprising an assemblage of spring plates of progressively decreasing lengths superposed centrally upon each other, secured together at the median lines thereof and curved to the form of a split ring, the shortest plate being nearest the center.

2. An elastic element for a resilient wheel comprising an assemblage of spring plates of progressively decreasing lengths superposed centrally upon each other, secured together at the median lines thereof and curved to the form of a split ring, the shortest plate being nearest the center, and means comprising an inward bending of the ends of the plates for limiting the contractile movement thereof.

In testimony whereof I affix my signature.

JEAN FRANÇOIS PASCAL COSTE.